May 25, 1965 — H. A. DELCELLIER — 3,185,192
MOUNTING AND DRIVE MEANS FOR BARKING APPARATUS
Filed Nov. 14, 1963 — 3 Sheets-Sheet 1
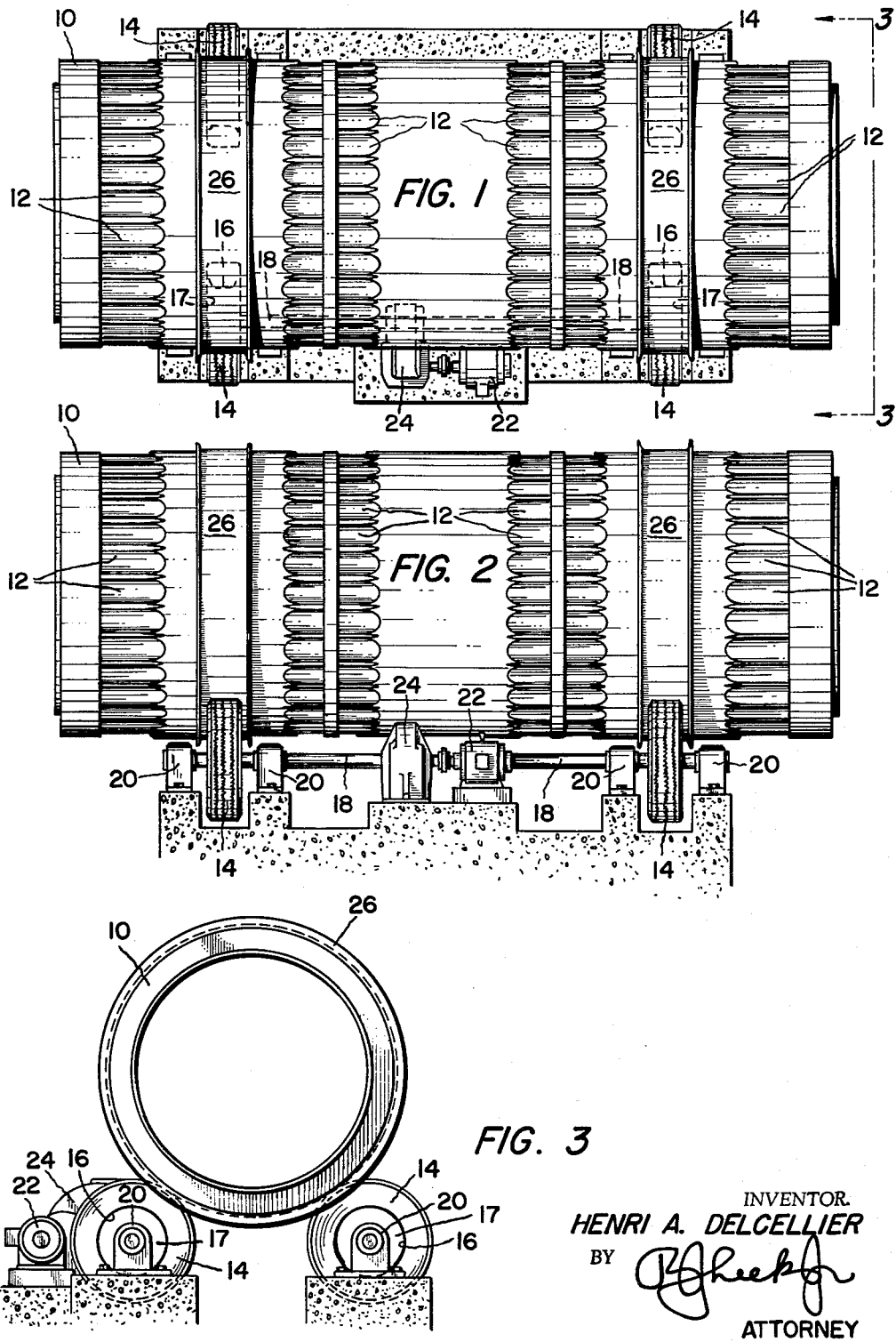
INVENTOR.
HENRI A. DELCELLIER
BY
ATTORNEY May 25, 1965 H. A. DELCELLIER 3,185,192
MOUNTING AND DRIVE MEANS FOR BARKING APPARATUS
Filed Nov. 14, 1963 3 Sheets-Sheet 2

INVENTOR.
HENRI A. DELCELLIER
BY
ATTORNEY

May 25, 1965 H. A. DELCELLIER 3,185,192
MOUNTING AND DRIVE MEANS FOR BARKING APPARATUS
Filed Nov. 14, 1963 3 Sheets-Sheet 3

INVENTOR.
HENRI A. DELCELLIER
BY
ATTORNEY

United States Patent Office 3,185,192
Patented May 25, 1965

1

3,185,192
MOUNTING AND DRIVE MEANS FOR
BARKING APPARATUS
Henri A. Delcellier, Beaurepaire, Quebec, Canada, assignor to Canadian Ingersoll-Rand Co., Ltd., Montreal, Canada, a corporation of Canada
Filed Nov. 14, 1963, Ser. No. 323,835
3 Claims. (Cl. 144—208)

This invention relates to apparatus for the debarking of logs and the like and more particularly to an improved mounting and drive means for such apparatus.

The objections to and defects of conventional log debarking apparatus of the drum type are:

(1) Due to the heavy load of logs and the impact of the logs as the logs are carried upwards and dumped one log upon another log, such drums are heavy, are subject to vibration fatigue, strain, wear and breakage; are difficult to journal; are expensive to build, to install and to maintain; and are noisy.

Specifically, conventional log debarking apparatus of the drum type:

(1) Have gear drives which usually give a pulsating drive, causing excessive wear of the drum teeth, shock stresses in the drive shaft and gear reducers and peak loads on the drive means thereby resulting in frequent maintenance problems; and (2) Are mounted on solid unresilient steel rollers which do not absorb the shock from the drive means or the shock and vibration caused by the tumbling wood, resulting in crystallization and failure of the welds between the staves and the supporting members and in some cases in the total failure of the drum.

The general objects of the present invention are to avoid and overcome the foregoing and other difficulties of and objections to prior art practices by the provision of an improved mounting and drive means for apparatus for debarking logs and the like, which mounting and drive means:

(1) Substantially eliminates vibration fatigue, strain, wear and breakage in the drum and its component parts;

(2) Substantially eliminates the drum journaling problem;

(3) Substantially reduces the cost of building, intsalling and maintaining the apparatus; and (4) Substantially reduces noise; and (5) Eliminates in one embodiment the drive pinion gear and the drum girth gear.

Specific objects of the present invention are to provide an improved mounting and drive means for log debarking apparatus and the like, which mounting and drive means:

(1) Substantially eliminate the pulsating drive;

(2) Substantially eliminates wear on the gear teeth;

(3) Substantially eliminates shock stresses in the drive shaft and gear reducers;

(4) Substantially eliminates peak loads on the drive means;

(5) Substantially absorbs the shock from the drive means; and the shock and vibration caused by the tumbling logs; and (6) Substantially eliminates crystallization and failure of the welds between the staves and the supporting members, and of the drum itself.

The aforesaid objects of the present invention, and other objects which will become apparent as the description proceeds, are achieved by providing an improved mounting and drive means for log debarking apparatus having a drum rotatable about an axis. The improved mounting and drive means comprises a rotatable fluid-filled means for resiliently supporting the drum and drive means connected to one of the drum and the fluid-filled means for causing rotation of the drum.

2

For a better understanding of the present invention, reference should be had to the accompanying drawings, wherein like numerals of reference indicate similar parts throughout the several views and wherein:

FIGURE 1 is a plan view of a log debarking apparatus incorporating the improved mounting and drive means of the present invention and showing the drive means connected to the mounting means;

FIG. 2 is a side elevational view of the apparatus shown in FIG. 1;

FIG. 3 is an end elevational view of the apparatus shown in FIG. 1 taken along the line 3—3 of FIG. 1 in the direction of the arrows;

Figure 4:
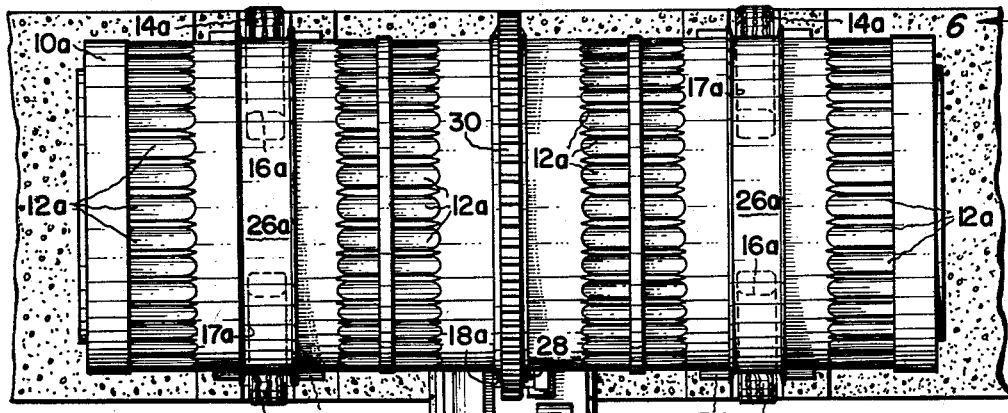
FIG. 4 is a plan view similar to FIG. 1 of an alternative embodiment showing the drive means connected to the drum.

The present invention is particularly adapted for use in conjunction with log debarking apparatus and hence it has been so illustrated and will be so described.

With specific reference to the form of the present invention illustrated in the drawings, and referring particularly to FIGS. 1–3, a barking drum is indicated generally by the reference numeral 10.

In order to debark logs (not shown) the drum 10 is provided with a tumbling means, such as the staves 12, mounted on the inner periphery of the drum 10. For the purpose of rotating the drum 10 about its longitudinal axis, the improved mounting and drive means of the present invention is utilized.

*Mounting and drive means*

Figure 6:
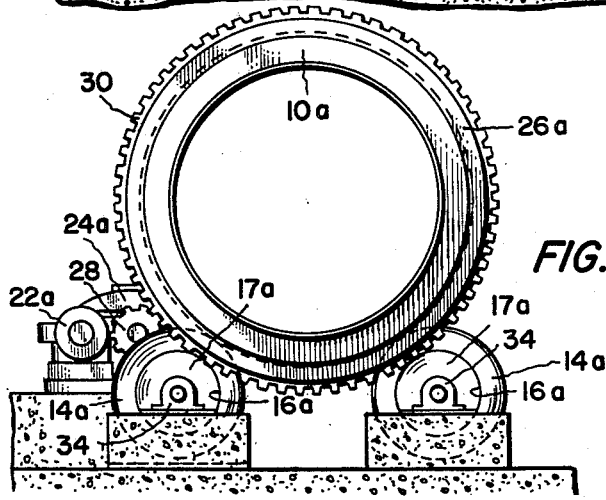
FIG. 6 is an end elevational view similar to FIG. 3 taken along the line 6—6 of FIG. 4 in the direction of the arrows.

The improved mounting and drive means has a rotatable fluid filled means, such as the pneumatic tires 14, mounted on rims 16 of wheels 17, FIGS. 1, 3 and 6, which wheels 17 are fixed to and rotatable by a shaft 18 journaled in bearings 20. The pneumatic tires 14 resiliently support the drum 10. The drive means, such as a motor 22, is connected to one of the drums 10 and the pneumatic tires 14 through a gear reduction 24 connected to the shaft 18 for causing rotation of the drum 10.

For the purpose of reinforcing the drum 10, and of preventing endwise slippage of the drum 10 to the right or left (as viewed in FIGS. 1 and 2) off the pneumatic tires 14, such pneumatic tires 14 ride in reinforcing and guide means, such as flanged tracks or rings 26 on the outer periphery of the drum 10.

*Alternative embodiments*

Figure 5:
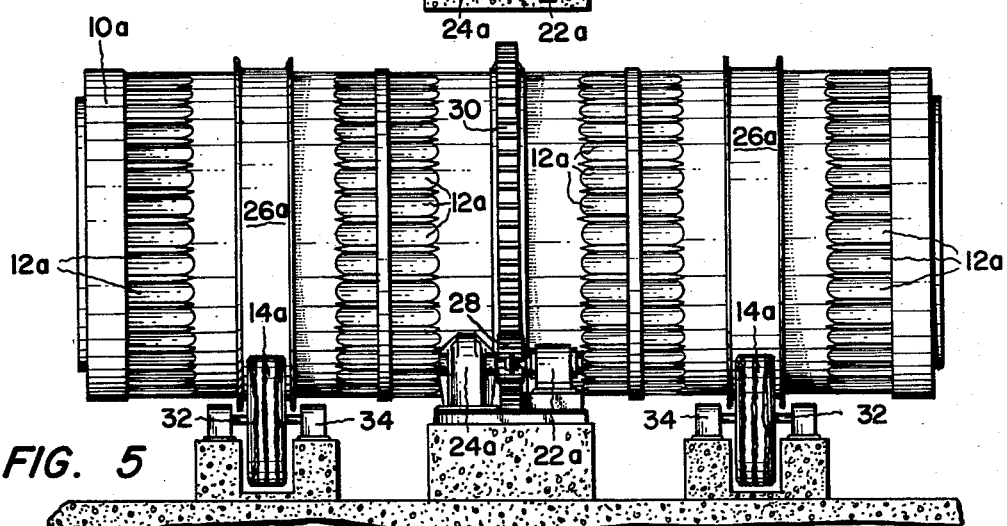
FIG. 5 is a side elevational view similar to FIG. 2 of the apparatus shown in FIG. 4.

It will be understood by those skilled in the art that alternatively as shown in FIGS. 4–6 that the drive means, such as the motor 22a, can be connected to the drum 10a for the purpose of driving the drum 10a by means of the gear reduction 24a, pinion gear 28 on the shaft 18a and girth gear 30 on the outer periphery of the drum 10a. In this case, the pneumatic tires 14a rotate on shafts 32 journaled in bearings 34.

Figure 7:
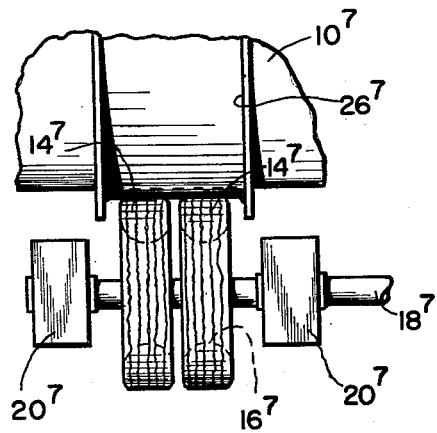
FIG. 7 is a fragmentary side elevational view of an alternative embodiment of the fluid-filled means, showing dual pneumatic tires at each mounting point for the drum.

For the purpose of reducing the drum load on each pneumatic tire $14^7$ (FIG. 7) and for increasing the traction surface on the pneumatic tire $14^7$ and ring $26^7$ and to provide a means of supporting the drum $10^7$ in the event one of the two tires $14^7$ blows out, pneumatic tires $14^7$ are mounted in tandem on the shaft $18^7$.

Figure 8:
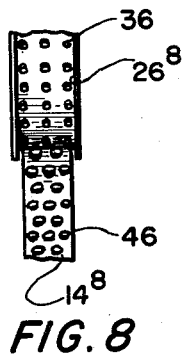
FIGS. 8–12 are side elevational views of alternative embodiments of the pneumatic tires and tracks.
Figure 9:
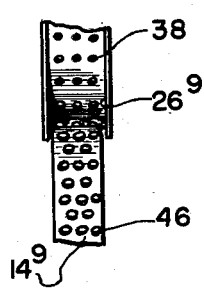
Figure 10:
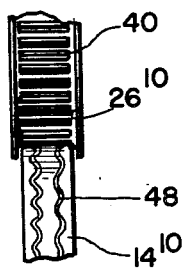
Figure 11:
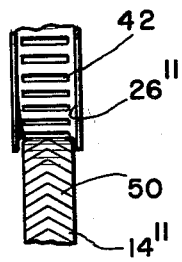
Figure 12:
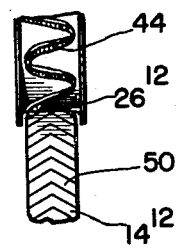

In order to provide positive traction between the rings $26^8$ etc. and the pneumatic tires $14^8$ etc. the rings $26^8$ may be provided with a roughened surface, such as protuberances 36 (FIG. 8), the depressions or cavities 38 on ring $26^9$ (FIG. 9), the raised bars 40 on ring $26^{10}$ (FIG. 10), the depressions 42 on ring $26^{11}$ (FIG. 11) and the raised wavy bar 44 on ring $26^{12}$ (FIG. 12). To further this positive traction the tires $14^8$ (FIG. 8), and $14^9$ (FIG. 9) may be provided with a knobby tread 46, or a squeegy tread 48 on tire $14^{10}$ or a herringbone tread 50 on tires $14^{11}$ and $14^{12}$ (FIGS. 11 and 12).

Figure 13:
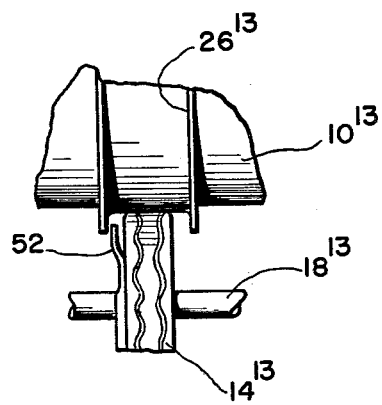
FIG. 13 is a view similar to FIG. 7 showing a safety rim on the tire to prevent excessive displacement of the drum in the event of a blow out, etc.

In FIG. 13 the tire $14^{13}$ is provided with a safety rim 52 to prevent excessive displacement of the drum $10^{13}$ in the event of blow out, etc.

It will also be understood that the tires 14, 14a, etc. may be filled with a fluid (other than air or a gas, such as carbon dioxide or nitrogen) such as a liquid, for example, water or glycerine.

It will be recognized by those skilled in the art that the objects of the present invention have been achieved by providing an improved mounting and drive means for log debarking apparatus, which improved mounting and drive means:

(1) Substantially eliminates vibration fatigue, strain, wear and breakage in the drum and its component parts;
(2) Substantially eliminates the drum journaling problem;
(3) Substantially reduces the cost of building, installing and maintaining the apparatus;
(4) Substantially reduces noise;
(5) Eliminates in one embodiment the drive pinion gear and the drum girth gear;
(6) Substantially eliminates the pulsating drive;
(7) Substantially eliminates wear on the gear teeth;
(8) Substantially eliminates shock stresses in the drive shaft and gear reducers;
(9) Substantially eliminates peak loads on the drive means;
(10) Substantially absorbs the shock from the drive means and the shock and vibration caused by the tumbling logs; and
(11) Substantially eliminates crystallization and failure of the welds between the staves and the supporting members and of the drum itself.

While in accordance with the patent statutes preferred and alternative embodiments of the present invention have been illustrated and described in detail, it is to be particularly understood that the invention is not limited thereto or thereby.

I claim:

1. In a log debarking apparatus, the combination comprising:
   (a) drum means rotatable about an axis;
   (b) reinforcing and guide means connected to the drum means and axially spaced from one another;
   (c) rotatable means for supporting the drum means including a pair of axially spaced fluid filled tires below the drum means on each side of the axis of rotation which engage the reinforcing and guide means;
   (d) the rotatable means including an extended rim associated with each tire to prevent displacement of the drum means in the event the associated tire collapses;
   (e) the contacting surfaces of the tires and the reinforcing and guide means being roughened to provide positive traction therebetween; and
   (f) drive means for rotating the drum about its axis on the rotatable means.

2. The combination in accordance with claim 1, wherein:
   (a) the drive means is connected to the rotatable means for rotating the drum means.

3. The combination in accordance with claim 1, and:
   (a) annular means encircling the drum means and connected thereto; and
   (b) the drive means including a driven means in engagement with the annular means to rotate the drum means.

References Cited by the Examiner
UNITED STATES PATENTS

| | | | |
|---|---|---|---|
| 45,698 | 1/65 | Camp | 241—178 |
| 2,111,422 | 3/38 | Fawick | 174—31.5 |
| 2,575,302 | 11/51 | Shaw | 144—208 |
| 3,056,561 | 10/62 | Hukki | 241—26 |
| 3,065,995 | 11/62 | Beacher | 301—39 |

OTHER REFERENCES

German printed application, 1,050,533, Feb. 12, 1959, Raimann (Kl 38a8).

Hennecke: German application 1,099,719, printed February 16, 1961 (Kl 38i1).

WILLIAM W. DYER, JR., *Primary Examiner.*

DONALD R. SCHRAN, *Examiner.*